United States Patent
Christiansen et al.

(10) Patent No.: US 7,371,422 B2
(45) Date of Patent: May 13, 2008

(54) CEREAL GRAIN KERNELS FORTIFIED WITH IRON AND CALCIUM

(75) Inventors: Earl Cleve Christiansen, South Ogden, UT (US); H. DeWayne Ashmead, Fruit Heights, UT (US); Kris Eugene Spence, Madeira, OH (US); Kenneth Thomas Smith, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 595 days.

(21) Appl. No.: 10/841,610

(22) Filed: May 7, 2004

(65) Prior Publication Data

US 2004/0228950 A1 Nov. 18, 2004

Related U.S. Application Data

(60) Provisional application No. 60/470,070, filed on May 13, 2003.

(51) Int. Cl.
*A23L 1/304* (2006.01)

(52) U.S. Cl. .......................... 426/74; 426/72; 426/619; 426/627; 426/656

(58) Field of Classification Search ................. 426/72, 426/74, 619, 627, 656
See application file for complete search history.

(56) References Cited

U.S. PATENT DOCUMENTS

| | | | |
|---|---|---|---|
| 3,969,540 A | 7/1976 | Jensen | |
| 4,020,158 A | 4/1977 | Ashmead | |
| 4,167,564 A | 9/1979 | Jensen | |
| 4,216,143 A | 8/1980 | Ashmead | |
| 4,216,144 A | 8/1980 | Ashmead | |
| 4,599,152 A | 7/1986 | Ashmead | |
| 4,774,089 A | 9/1988 | Ashmead | |
| 4,786,510 A | 11/1988 | Nakel | |
| 4,786,518 A | 11/1988 | Nakel | |
| 4,830,716 A | 5/1989 | Ashmead | |
| 4,863,898 A | 9/1989 | Ashmead | |
| 6,174,553 B1 * | 1/2001 | Cerda et al. | 426/96 |
| 2002/0150607 A1 | 10/2002 | Manning et al. | |

FOREIGN PATENT DOCUMENTS

EP 0 297 679 A2 1/1989
JP 07170923 7/1995

OTHER PUBLICATIONS www.cdc.gov/mmwr/preview/mmwrhtml/mm5140a1, Oct. 11, 2002, pp. 897-899.
Pineda, O., et al.; Nutrition, 2001 pp. 17381-17384.
Bovell-Benjamin, A., et al.; "Sensory Quality and Lipid Oxidation of Maize Porridge", Journal of Food Science, vol. 64, No. 2, 1999, pp. 371-376.
Ashmead, et al.; "The Chemistry of Ferrous Bis-glycinate Chelate", Journal of Latin American Nutrition, vol. 51, No. 1, 2001, pp. 7-12.
Peil, et al.: "Retention of Micronutrients by Polymer Coatings Used to Fortify Rice", Journal of Food Science, vol. 47 (1981), p. 260-262.
Dexter, Patricia B.: "Rice Fortification For Developing Countries", Department of Food Science, University of Arkansas, Aug. 1998.

* cited by examiner

*Primary Examiner*—Helen Pratt
(74) *Attorney, Agent, or Firm*—Adam W. Borgman; Carl J. Roof; S Robert Cheuy

(57) ABSTRACT

Described are cereal grain kernels fortified with iron and calcium. Also described is a process for making cereal grain kernels fortified with iron and calcium, the process comprising providing cereal grain kernels and mixing said kernels with a composition comprising an iron source and a calcium source.

19 Claims, No Drawings

CEREAL GRAIN KERNELS FORTIFIED WITH IRON AND CALCIUM

CROSS REFERENCE TO RELATED APPLICATIONS

This application claims the benefit of priority to U.S. Provisional Application Ser. No. 60/470,070, filed May 13, 2003, which is herein incorporated by reference.

TECHNICAL FIELD

The present invention is directed to cereal grain kernels fortified with highly bioavailable sources of iron and highly soluble and bioavailable sources of calcium. More specifically, the invention relates to fortified cereal grain kernels fortified with an iron source and calcium salts of citric and malic acid.

BACKGROUND OF THE INVENTION

In many countries, the average diet does not contain sufficient levels of iron and iron deficiency is well documented. Although iron deficiency is one of the few nutritional deficiencies in the U.S., it is common in most developing countries. Iron is an essential component of the hemoglobin molecule: without iron the bone marrow is unable to produce hemoglobin. The red cell count falls and those that do enter circulation are smaller than normal (microcytic) and lacking in hemoglobin, hence they are pale (hypochromic). There are many symptoms of anemia. Each individual will not experience all the symptoms and if the anemia is mild, the symptoms may not be noticeable. Some of the symptoms are: Pale skin color, fatigue, irritability, dizziness, weakness, shortness of breath, sore tongue, brittle nails, decreased appetite (especially in children), headache—frontal. Iron deficiency anemia significantly impairs mental and psychomotor development in infants and children.

The average amount of iron in the average adult male is 4 gm and in the average adult female 2.5 gm. The normal North American diet contains approximately 15-20 mg of iron per day. Most is present in meat and green vegetables; approximately 1.0 mg is absorbed each day and just about an equal amount is lost in feces and sweat. As a result, the average adult's iron intake is in delicate balance, but is of little consequence as there is slightly more iron absorbed than lost and a store of iron is gradually accumulated. If for some reason the rate of iron loss increases, these stores can be depleted and an absolute iron deficiency develops. Such a deficiency requires large doses of supplemental iron to re-supply the body stores and sufficient monitoring to prevent iron overload. In developing countries, about one-half of all women and children suffer from iron-deficiency anemia. In the Unites States, 7% of toddlers aged 1-2 years and 9%-16% of adolescent and adult females aged 12-49 years are iron deficient. The prevalence of iron deficiency has been estimated to be two times higher among non-Hispanic black and Mexican-American females (19%-22%) than among non-Hispanic white females (10%). (See www.cdc.gov/mmwr/preview/mmwrhtml/mm5140al.) Iron may be added to foods and beverages to supplement the dietary sources. Insoluble iron compounds need to be added to products as a suspension.

Calcium is an essential nutrient needed throughout life for a number of important physiologic functions. It is reported that ninety-nine percent of the body's calcium is present in teeth and bones. Therefore, calcium is needed for both formation and maintenance of bones and teeth. The remaining one percent of calcium is located throughout the body in the blood and soft tissues and is ionized in part. In its ionized form, calcium is of great importance for blood coagulation, proper functioning of the heart, nerves, and muscles, and in the permeability of membranes. Scientific research shows evidence that calcium plays a role in protecting against high blood pressure and colon cancer. If there are inadequate amounts of calcium from dietary sources, skeletal calcium will always be sacrificed to satisfy the metabolic needs of the soft tissues. Thus, when dietary calcium intake is inadequate, skeletal metabolism is compromised. Under this circumstance, less bone is accumulated during growth and calcium is withdrawn from the adult skeleton with a concomitant reduction of bone strength.

In many parts of the world, calcium intakes fall well below the recommended amounts. Although nutritionists have stressed the importance of receiving the daily nutritional requirements of calcium in the diet, it is difficult to achieve the required amount of calcium through a regular diet. Calcium can also be obtained through a variety of dietary sources, but a major problem with calcium supplementation from foods and beverages is the solubility of the calcium. Insoluble calcium salts need to be added to products as a suspension, but this often leads to negative changes in taste and texture as well as suspension settlement. In addition, insoluble calcium sources are generally absorbed less than soluble forms. Calcium can also impart a biting or burning sensation in the mouth when consumed at higher levels, and can leave an unpleasant aftertaste in the mouth depending upon the source of the calcium.

Iron and calcium deficiencies can be overcome by increasing the intake of foods naturally containing these minerals or by taking supplements. With respect to the former, there is obviously difficulty, particularly in developing countries, with increasing intake of foods that are high in iron and calcium. With respect to the latter, in many countries where the people suffer from these deficiencies, the economy is such that providing minerals as a supplement is expensive and presents significant distribution logistics problems. In addition, compliance, i.e., having the people take the mineral supplements on a daily basis, is a serious problem. Accordingly, the delivery of iron and calcium in a form that is bioavailable and at the same time has a non-objectionable taste and appearance, and in a form that would be consumed by a high proportion of the population at risk, is desirable.

Cereal grains have been fortified with many different vitamins and minerals, including iron and calcium. For example, in U.S. Pat. No. 6,159,530, issued Dec. 12, 2000, Christiansen et al. describe processed cereal fortified with metal amino acid chelates, where the metal can be selected from various moieties, including iron or calcium. In U.S. Pat. No. 6,207,204, issued Mar. 27, 2001, Christensen et al. describe cereal grain kernels fortified with metal amino acid chelates, again where the metal can be selected from, for example, iron or calcium. However, the forms of calcium described therein are less soluble than the calcium forms described herein. In this regard, Applicants have surprisingly discovered that the calcium forms described herein exhibit increased solubility, such that enhanced levels of fortification can be achieved.

In view of the foregoing, it would be useful to provide improved cereal grain kernels that are fortified with iron and calcium. More specifically, it would be useful to provide fortified cereal grain kernels where the iron and calcium are incorporated to provide increased bioavailability such that smaller amounts of these materials may be used to fortify a cereal grain kernel, thereby reducing unwanted side effects and unpalatability.

SUMMARY OF THE PRESENT INVENTION

In one aspect, the invention relates to cereal grain kernels fortified with iron and calcium, wherein the calcium is in the form of calcium salts of citric acid and malic acid.

In another aspect, the invention relates to a process for making fortified cereal grain kernels, the process comprising providing cereal grain kernels and mixing said kernels with a composition comprising an iron source and a mixture of calcium salts of citric and malic acid.

DETAILED DESCRIPTION OF THE INVENTION

I. Definitions

The singular forms "a," "an," and "the" include plural referents unless the content clearly dictates otherwise.

The term "bioavailable" means that the mineral source is in a form that is capable of being transported intact across the intestinal wall to the blood stream via active transport. With respect to iron in foods, the bioavailability, or more specifically the relative bioavailability (RBV), is measured as the incremental absorption of that iron in a standardized diet or test meal. A method for determining the bioavailability in mammals is the depletion/repletion method in rats. Forbes, A. L. et al., 1989, Am. J. Clin. Nutr. 49:225-238. This method allows for accurate comparison of relative bioavailabilities of iron compounds. Using this method, weanling rats are fed an iron free diet until they become anemic. After a baseline hemoglobin measurement, the rats are fed a diet containing one of the iron compounds to be tested. A control group is fed a standard diet containing ferrous sulfate. After a two-week period, a final hemoglobin measurement is taken and compared to the baseline measurement. Using this method, average relative bioavailabilities of iron have been measured in rats. Ferrous sulfate has been used as a reference and has an RBV of 100%, against which other iron compounds are compared. Bioavailability is the result of more than the solubility of the compound. Environmental factors, such as pH or iron concentration, particle size, and the presence of inhibitors also affect bioavailability. It has been shown that ferrous bis-glycinate chelate (iron amino acid chelate) has a greater RBV than ferrous sulfate. Ferrous bis-glycinate was shown to have a RBV of 90.9% compared to 26.7% for ferrous sulfate in infants (Pineda, O. and Ashmead H. D., 2001, Nutr. 17381-17384) and was absorbed 4.7 times better than ferrous sulfate in adult college students (Bovell-Benjamin, A., et al. 1999, Am. J. Clin. Nutr. 71:1563-1569).

The term "calcium citrate malate" ("CCM") refers to a composition of calcium salts of citric acid and malic acid. The calcium citrate malate may consist of a mixture of calcium citrate and calcium malate, a complex of calcium containing citrate and malate ligands, a mixture of a calcium salt with citric acid and malic acid, or any combination thereof. For purposes of the present disclosure, and as described in more detail below, the CCM may be described in terms of "Equivalents Ratio", as well as in terms of Citrate:Malate Molar Ratio. The Equivalents Ratio is the equivalents of citrate and malate (3×moles citrate +2×moles malate) divided by the equivalents of calcium (2×moles calcium). The Citrate:Malate Molar Ratio is simply the molar ratio of these two components. For the citrate:malate molar ratio and for the Equivalents Ratio, citrate and malate includes their acid forms (citric and malic acids) and their anionic salt forms (citrate and malate). Additionally, the amount of citrate and malate used in calculating the Equivalents Ratio and the Citrate:Malate Molar Ratio include any citric or malic acid introduced via a source other than the CCM.

II. Fortified Cereal Kernels

The fortified cereal grain kernels of the present invention may be prepared by coating cereal grains with a liquid mixture (e.g., a solution, slurry, suspension) containing the desired minerals and drying the coated grains prior to packaging. The fortification process can be carried out by spraying or dripping a mineral solution onto a rotating bed of rice in one or many successive layers. The solubility of the calcium citrate malate and iron sources allows the minerals to be evenly applied to the rice, covering all grain kernels, while maintaining the normal appearance of the premix (fortified rice). Cooking the pre-mix fortified rice, with or without mixing with plain rice, results in the entire pot of rice evenly fortified with calcium and iron. It is also believed that the minerals are more readily adsorbed by the rice grain during cooking.

A. Iron Component

In general, highly bioavailable iron sources are preferred for use herein. A preferred source of highly bioavailable iron is ferrous bis-glycinate chelate because it has a RBV greater than ferrous sulfate. Freely water-soluble iron-containing compounds or those that are soluble in dilute acid have better bioavailabilities than iron sources that are not as soluble, and therefore are also preferred for use herein. Water insoluble iron-containing compounds or those poorly soluble in dilute acid generally have a low to moderate bioavailability, depending on environmental conditions, and therefore are less preferred, although still potentially useful herein. In one aspect, preferred iron-containing compounds used herein will have an RBV of at least about 50%. In that aspect, more preferred iron-containing compounds will have an RBV of at least about 70%, still more preferably at least about 80%. Some compounds are known enhancers of iron absorption and may increase iron bioavailability, such as vitamin C or other organic acids. Inclusion of enhancers could make a less bioavailable iron source more bioavailable.

Regardless of the iron source employed, the iron will typically be included at a level of at least about 0.001%, by total weight of the fortified cereal grain kernel. Typically, the iron will be included at a level of from about 0.001% to about 0.1%, more typically at a level of from about 0.0015% to about 0.007%, and still more typically at a level of from about 0.002% to about 0.005%, by total weight of the fortified cereal grain kernel.

The preferred iron component is selected from the group consisting of ferric salts, ferrous salts, ferrous amino acid chelates, iron-sugar-carboxylate complexes, and mixtures thereof.

With respect to iron salts, food grade ferrous salts that can be used in the present invention include, for example, ferrous sulfate, ferrous fumarate, ferrous succinate, ferrous gluconate, ferrous lactate, ferrous tartrate, ferrous citrate, as well as mixtures of these ferrous salts. As mentioned, while ferrous iron is typically more bioavailable than ferric iron, ferric salts can also provide bioavailable sources of iron. Food grade ferric salts that can be used in the present invention include, for example, sodium iron ethylene diamine tetra acetate (EDTA), ferric saccharate, ferric ammonium citrate, ferric ammonium sulfate, hemoglobin, ferric albuminate, ferric choline citrate, ferric glycerophosphate, ferric citrate, ferric pyrophosphate, ferric sulfate, ferric chloride, as well as mixtures of these ferric salts.

Preferred iron compounds for use herein are iron amino acid chelates. The most preferred embodiment of the iron amino acid chelate is ferrous bis-glycinate. The terms "iron amino acid chelate" and "ferrous amino acid chelate" mean that coordinate covalent bonds exist between the iron (ferrous) atom and the carboxyl oxygen, the carbonyl carbon, the α-carbon and the α-amino nitrogen of the amino acid. As such, a heterocyclic ring is formed with the iron as the closing member. However, as the pH level is reduced, the bond between the carboxyl oxygen and the iron-closing member becomes less covalent and more ionic, though there may still be a ring structure present. Therefore, an iron amino acid chelate, for purposes of the present disclosure, includes any chelate or complex comprised of an amino acid and an iron forming a ring structure. The actual structure will depend upon the ligand to iron mole ratio. In any event, the ligand to iron mole ratio is at least about 1:1 and is preferably at least about 2:1. In certain instances, the ligand to iron ratio may be about 3:1 or even about 4:1.

Ferrous amino acid chelates particularly suitable as highly bioavailable amino acid chelated iron for use in the present invention are those having a ligand to metal ratio of at least about 2:1. For example, suitable ferrous amino acid chelates having a ligand to metal mole ratio of two are those of formula:

where L is an alpha-amino acid, a dipeptide, a tripeptide or a quadrapeptide reacting ligand. Thus, L can be any reacting ligand that is a naturally occurring alpha-amino acid selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine; or a dipeptide, tripeptide or quadrapeptide formed by any combination of these alpha-amino acids. See U.S. Pat. No. 3,969,540(Jensen), issued Jul. 13, 1976 and U.S. Pat. No. 4,020,158 (Ashmead), issued Apr. 26, 1977; U.S. Pat. No. 4,863,898 (Ashmead et al), issued Sep. 5, 1989; U.S. Pat. No. 4,830,716 (Ashmead), issued May 16, 1989; and U.S. Pat. No. 4,599,152 (Ashmead), issued Jul. 8, 1986, all of which are incorporated by reference. Particularly preferred ferrous amino acid chelates are those where the reacting ligands are glycine, lysine, and leucine. Most preferred is the ferrous amino acid chelate sold under the Trade name FERROCHEL® by Albion Laboratories (Clearfield, Utah), where the reacting ligand is glycine.

The structure, chemistry and bioavailability of amino acid chelates is well documented in the literature, e.g. Ashmead et al., Chelated Mineral Nutrition, (1982), Chas. C. Thomas Publishers, Springfield, Ill.; Ashmead et al., Intestinal Absorption of Metal Ions, (1985), Chas. C. Thomas Publishers, Springfield, Ill.; Ashmead et al., Foliar Feeding of Plants with Amino Acid Chelates, (1986), Noyes Publications, Park Ridge, N.J.; Ashmead, S. (2001) Arch. Lat. Amer. Nutr., Supp. 51:7-12; Ashmead, H. D. (2001) Arch. Lat. Amer. Nutr., Supp. 51:12-21; U.S. Pat. Nos. 4,020,158; 4,167,564; 4,216,143; 4,216,144; 4,599,152; 4,774,089; 4,830,716; 4,863,898 and others.

One advantage of amino acid chelates in the field of mineral nutrition is attributed to the fact that these chelates are readily absorbed in the gut and mucosal cells by means of active transport as though they were dipeptides. In other words, the minerals are absorbed along with the amino acids as a single unit utilizing the amino acids as carrier molecules. Therefore, the problems associated with the competition of ions for active sites and the suppression of specific nutritive mineral elements by others are avoided. This is especially true for compounds such as iron sulfates that must be delivered in relatively large quantities in order for the body to absorb an appropriate amount leading to possible nausea, diarrhea and other discomforts. Because iron is such an important mineral to many physiological functions and because unfortified foods taken in by a typical person lack a sufficient amount of iron, fortification remains one of the best methods of affording people the minimum daily requirement of iron.

Another iron source suitable for use herein include iron-sugar-carboxylate complexes. In these iron-sugar-carboxylate complexes, the carboxylate provides the counterion for the ferrous (preferred) or ferric iron. The overall synthesis of these iron-sugar-carboxylate complexes involves the formation of a calcium-sugar moiety in aqueous media (for example, by reacting calcium hydroxide with a sugar, reacting the iron source (such as ferrous ammonium sulfate) with the calcium-sugar moiety in aqueous media to provide an iron-sugar moiety, and neutralizing the reaction system with a carboxylic acid (the "carboxylate counterion") to provide the desired iron-sugar-carboxylate complex. Sugars that can be used to prepare the calcium-sugar moiety include any of the ingestible saccharidic materials, and mixtures thereof, such as glucose, sucrose and fructose, mannose, galactose, lactose, maltose, and the like, with sucrose and fructose being the more preferred. The carboxylic acid providing the "carboxylate counterion" can be any ingestible carboxylic acid such as citric acid, malic acid, tartaric acid, lactic acid, succinic acid, propionic acid, etc., as well as mixtures of these acids.

These iron-sugar-carboxylate complexes can be prepared in the manner described in U.S. Pat. Nos. 4,786,510 and 4,786,518 (Nakel et al), issued Nov. 22, 1988. These materials are referred to as "complexes," but they may in fact exist in solution as complicated, highly hydrated, protected colloids; the term "complex" is used for the purpose of simplicity.

B. Calcium Component

The nutritionally supplemental amount for calcium will generally be included in an amount of from about 0.03% to about 2%, by total weight of the fortified cereal grain kernel. Typically, the calcium will be included at a level of from about 0.08% to about 1.5%, still more typically at a level of from about 0.1% to about 1%, by total weight of the fortified cereal grain kernel.

Applicants have discovered that use of the calcium citrate malate, which is highly soluble, facilitates fortifying the grain kernels with the desired amounts of calcium, but without negatively impacting the organoleptic character of the resulting kernels. This solubility, combined with relatively high bioavailability of the calcium, provides a more desirable form of calcium compared with prior iron and calcium fortified grains.

As discussed above, the calcium citrate malate may consist of a mixture of calcium citrate and calcium malate, a complex of calcium containing citrate and malate ligands, a mixture of a calcium salt with citric acid and malic acid, or any combination thereof.

In one aspect, the CCM utilized will have a Citrate:Malate Molar Ratio of from about 10:90 to about 80:20 and an Equivalents Ratio of from about 0.5 to about 2. In another aspect, the CCM utilized will have a Citrate:Malate Molar Ratio of from about 20:80 to about 70:30 and an Equivalents Ratio of from about 0.6 to about 1.4. In another aspect, the CCM utilized will have a Citrate:Malate Molar Ratio of from about 35:65 to about 55:45 and an Equivalents Ratio of from about 0.8 to about 1.2. The calcium citrate malate may optionally contain other anions in addition to citrate and malate. Such anions may include, for example, carbonate, hydroxide, phosphate and mixtures thereof.

In one aspect, the calcium citrate malate preferably is neutral, comprised entirely of citrate and malate anions. Thus, in this embodiment, the equivalents of calcium (2×moles calcium) will be approximately equal to the total number of equivalents of citrate (3×moles citrate) plus malate (2×moles malate). Preferred calcium citrate malate will have a Citrate:Malate Molar Ratio of from about 35:65 to about 55:45 and an Equivalents Ratio of from about 1 to about 1.2.

Mixtures of calcium salts and citric and malic acids may be used to form calcium citrate malate in situ, and the resulting liquid mixture is thereafter used as the source for fortifying the cereal grain kernels. Alternatively, one can use a calcium citrate malate salt and add that material to make a CCM liquid mixture, which is thereafter used to fortify the cereal grain kernels. Calcium citrate malate may be made, for example, by first dissolving citric acid and malic acid, in the desired molar ratio, in water. The calcium source may then be added to the solution, in such amount that the ratio of moles calcium to moles citrate and moles malate is as desired. Various calcium sources may be used in the present invention. For example, calcium chloride, calcium phosphate and calcium sulfate can be used, but they may not be preferred since the anions could make an acid solution, i.e. hydrochloric acid, sulfuric and phosphoric acid, respectively, which can adversely affect the flavor of foods containing the calcium citrate malate. Preferred sources of calcium include calcium carbonate, calcium oxide and calcium hydroxide.

A solid may form during the mixing of calcium oxide or calcium hydroxide with the citric and malic acid. When these materials are used, it may be desirable to mix the solution until all of the calcium appears to have dissolved. The calcium citrate malate will precipitate when its solubility is exceeded.

The preferred method of preparation is to prepare a highly concentrated solution of the calcium citrate malate that quickly and efficiently forces metastable calcium citrate malate out of solution. Concentrations of from 20% to 75% are preferred. Preferably the concentration is from 40% to 65%. The reaction temperature can be ambient (20° C.) or higher. Preferably, the temperature of the reaction is in the range of from about 30° C. to about 80° C., more preferably from about 40° C. to about 60° C. If desired, the mixture can be filtered and/or dried, with a drying temperature of less than 100° C.

C. Optional Components

A coloring agent, such as titanium dioxide, may optionally be included when appropriate. For example, when coating white rice with ferrous bisglycinate, the use of titanium dioxide acts as a whitening agent to reduce discoloration.

Edible acids and their salts may be used as complexing agents or reducing agents or to improve organoleptic acceptance of the fortified product, or for addition of other minerals. Suitable reducing agents include ascorbic acid, ascorbyl palmitate, sodium bisulfite, erythorbic acid, as well as mixtures of these reducing agents. Suitable complexing agents include hydroxypolycarboxylic acids such as citric acid, tartaric acid, and malic acid; phosphates and polyphosphates and their respective salts such as sodium hexametaphosphate, sodium trimetaphosphate, and sodium tripolyphosphate; aminopolycarboxylic acids and their respective partial salts such as ehtylenediamine tetraacetic acid, the disodium salt of ehtylenediamine tetraacetic acid, and diethylenetriamine pentaacetic acid; certain short chain carboxylic acids such as lactic acid, fumaric acid, and acetic acid; as well as mixtures of these complexing agents. The preferred complexing agent is citric acid. (This citric acid is in addition to the citric acid delivered via the calcium citrate malate source.)

The coating on the cereal grain may further comprise a food grade antioxidant in an amount sufficient to inhibit oxidation of materials, especially lipids, on the surface of the cereal grain. Excessive oxidation can contribute to off-flavor development and off-odors. Known or conventional antioxidants include, but are not limited to, butylated hydroxyanisole (BHA), butylated hydroxytoluene (BHT), tert-butylhydroquinone (TBHQ), rosemary extract, and mixtures thereof.

To further enhance oxidative stability, the product should be packaged in a moisture impervious container. Such containers include, for example, foil lined packages, metal cans, and plastic or laminate packages. The product can be packaged under nitrogen, carbon dioxide, or other inert non-oxidizing gases to further enhance oxidative stability and shelf life of the product. Such packaging methods are well known in the art.

A flavoring or aroma agent may also be added to the coating mixture. The cereal grain can be flavored or enhanced with any naturally or synthetically prepared fruit or botanical flavors, aroma compounds, or mixtures thereof. Suitable natural or artificial flavors or aromas include rice, jasmine, bamboo, pandang, or other compatible flavors or aromas.

D. Fortified Kernel Preparation

Any cereal grain kernels while intact as kernels can be used in the present invention, including kernels where the germ and/or husk has been removed. Barley, corn, millet, oats, quinoa, rice, wild rice, rye, sorghum, triticale and wheat are preferred cereal grains. Particularly preferred is rice.

In the present invention, an iron- and calcium-containing coating is applied to the cereal grain kernel (or a liquid mixture used for coating the kernels). The iron and calcium may be added to the kernels via one liquid mixture or as two separate coating liquid mixtures. The coating mixture may optionally include a stabilizer. This stabilizer is preferably hydrophillic or neutral hydrocolloid gum such as, for example, hydroxypropyl cellulose, hydroxypropyl methylcellulose, gum acacia, starches or modified starches, and ethyl cellulose, but may also include hydrophobic or alcohol-soluble polymers such as shellac or zein.

The application of the coating containing the iron and calcium sources may be accomplished by several methods. For example, if it is desired to fortify rice with ferrous bisglycinate and calcium citrate malate, a coating may be prepared and applied by spraying or soaking the cereal grain kernel with a liquid mixture containing the iron chelate and calcium source, a stabilizer carrier and optionally a coloring agent. If prepared accordingly, the coating is virtually undetectable in texture and is palatable.

In one general approach, the means of fortifying cereal grain with iron amino acid chelate and calcium citrate malate is as follows. First, a cereal grain and a liquid mixture containing iron amino acid chelate, calcium citrate malate, and a carrier stabilizer is provided. Next, a known amount of the liquid mixture containing the amino acid chelate and calcium is coated on a portion or the entire cereal grain kernel in order to achieve a desired concentration of the minerals per cereal kernel. The moisture is then reduced by procedures generally known in the art. Finally, it may be desired to premix fortified cereal grain kernels with unfortified cereal grain kernels at a ratio that will provide an adequate amount of the minerals in a single serving of the now blended cereal kernels to meet the minimum daily requirement for the particular metal. If this step is followed, the preferred ratio of fortified to unfortified cereal grain kernels is from about 1:1 to about 1:10 by weight. However, some preparations may not require this step as the coating mixture may contain less of the minerals or a more concentrated mixture may be applied to a larger volume of cereal grain kernels.

In a preferred process for making the fortified kernels, the liquid mixture used for coating the cereal grain kernels is prepared by mixing a stabilizer carrier with an aqueous mixture until a homogenous liquid is formed. Next, an edible acid, calcium citrate malate, and metal amino acid chelate are added to the carrier until a homogenous slurry is formed. Next, alcohol or an alcohol mixture containing flavor ingredients or antioxidant ingredients may be added and mixed well. If applying the coating using a spraying method, one embodiment includes placing the kernels in a coating pan, forcing hot air onto the kernels and spraying the homogenous liquid while the hot air is flowing. This should be continued until the kernels are saturated to a predetermined degree. Optional steps of 1) covering cereal grain with coloring agent, e.g., titanium dioxide, prior to the step of blowing forced hot air into the pan, and/or 2) covering the cereal grain with a coloring agent after the cereal grain has been sprayed with the homogenous liquid may be followed if it is desirable to alter the color of the fortified cereal grain kernels.

If the coating is applied using the soaking method, it may be preferred for the kernels to first be soaked in the homogenous liquid described above and dried using conventional drying techniques until the moisture reaches a predetermined level. If necessary, the cereal grain kernels should be separated by shaking. Optionally, titanium dioxide or other coloring agents may be admixed with the fortified cereal grain kernels to alter the color of the kernels.

Analyses of the Fortified Rice

Inductively Coupled Plasma (ICP) spectroscopy is a fast and efficient method for the elemental analysis of enriched rice. This method has good sensitivity for extremely low levels of metals, such as calcium and iron. This allows for sample sizes to be small, so they are more easily handled and supplied. ICP spectroscopy can be used to detect multiple metals during the same analysis period, unlike atomic absorption (AA) and ultraviolet (UV) spectroscopy. It also is a relatively neat method. Nitric acid is the only additional chemical needed. The plasma is proficient in breaking down analytes to their elemental components as long as the analytes are liquid. Rice is easily put into solution via microwave digestion. Another benefit is that this method is inclusive, the whole grain is analyzed. This minimizes loss that may occur during extractions or other processes needed for UV and AA analysis. Also, vulnerabilities that exist with UV or AA spectroscopy in regard to pH, color stability, and oxidation state are minimal with ICP spectroscopy.

III. EXAMPLES

The following examples illustrate compositions and methods of preparing a calcium citrate malate and metal amino acid chelate coating for cereal grain kernels. Specifically, the examples set forth two of the known coating embodiments, i.e., spraying and soaking, for fortifying grain kernels with a soluble iron chelate and calcium citrate malate. The composition of the CCM used in these examples has a Citrate:Malate molar ratio of from about 40:60 with an Equivalents ratio of about 1, unless specified otherwise. In the examples, the level of fortification reached for the fortified rice accounts for yield losses due to small scale processing. The use of larger scale production may give a more efficient yield. These examples should not be considered as limitations of the present invention, but merely illustrate how to make the fortified cereal grain kernels of the present invention.

Example 1

The following is a method for fortifying white rice with ferrous bisglycinate and calcium citrate malate using the spraying method. First, 340 g of hydroxypropyl methylcellulose is slowly added to 17.625 kg of water and mixed under sheer and good agitation. Next 4.49 kg of the gum solution is poured into a container and used to make the spray slurry. Add 101 g of citric acid anhydrous with good agitation (to reduce pH of slurry to 4.0 or less). Dry blend 1030 g of calcium citrate malate (20.8% calcium by weight) and 16 g of ferrous bisglycinate. Next these dry ingredients are admixed with the gum and acid mixture with high shear agitation until completely well dispersed. An additional 551 g of food-grade ethanol is mixed with 16 g of powdered flavor and this is added to the slurry with additional mixing.

Next 40 kg of rice is placed in a revolving pan. Hot air is forced into the pan as 3908 g of the liquid mixture containing the calcium citrate malate and ferrous bisglycinate is sprayed onto the rice. When all of the liquid mixture is evenly applied the coated rice is allowed to dry to less than 14% moisture and/or less than 0.65 water activity. From this process, 40 kg of rice is fortified with ferrous bisglycinate and calcium citrate malate having an iron content of about 48 ppm and a calcium content of about 3000 ppm, respectively. The finished product will provide 300 mg of calcium and 4.80 mg of iron per 100 g of rice. Additionally, 1 part of fortified rice can be mixed with 3 parts of plain rice to provide 1.2 mg of iron and 75 mg of calcium in 100 g of (uncooked) mixed rice.

Example 2

The following is a method for fortifying white rice with ferrous bisglycinate and calcium citrate malate using the spraying method. First, 153 g of hydroxypropyl methylcellulose is slowly added to 3.76 kg of water and mixed under sheer and good agitation. In another container, 74.9 g of citric acid added to 4.22 kg of water and then 1844 g of calcium citrate malate is added under sheer and good agitation. In a third container, 29 g of ferrous bisglycinate and 115 g of a spray-dried flavor are added to 988 g of absolute ethanol. All of the solutions are then mixed under good agitation.

Next 40 kg of rice is placed in a revolving pan. Hot air is forced into the pan as 3908 g of the liquid mixture containing the calcium citrate malate and ferrous bisglycinate is sprayed onto the rice. When all of the liquid mixture is evenly applied, the coated rice is allowed to dry to less than 14% moisture and/or less than 0.65 water activity. From this process, 40 kg of rice is fortified with ferrous bisglycinate and calcium citrate malate having an iron content of about 92 ppm and a calcium content of about 6480 ppm, respectively.

Example 3

The following is a method for fortifying white rice with sodium iron EDTA and calcium citrate malate using the spraying method. First, 6.56 g of hydroxypropyl methylcellulose is slowly added to 345.8 g of water and mixed under sheer and good agitation. Next, 4.8 g citric acid monohydrate is added to the gum solution. Next 79.3 g of calcium citrate malate is admixed with 1.88 g of sodium Iron (III) ethylene diamine tetra acetate (for example, FERRAZONE®, available from Azko-Nobel, Herkenbosch, The Netherlands) and added to the mixture under sheer and good agitation. To this mixture, 4.96 g of spray-dried flavor and 42.44 g of absolute ethanol are added and mixed under good agitation.

Next 2 kg of rice is placed in a revolving pan. Hot air is forced into the pan as 264.1 g of the liquid mixture containing the calcium citrate malate and sodium Iron (III) ethylene diamine tetra acetate is sprayed onto the rice. When all of the liquid mixture is evenly applied, the coated rice is allowed to dry to less than 14% moisture and/or less than 0.65 water activity. From this process, 2 kg of rice is fortified with sodium Iron (III) ethylene diamine tetra acetate and calcium citrate malate having an iron content of about 48 ppm and a calcium content of about 3200 ppm.

Example 4

The following is a method for fortifying white rice with ferrous bisglycinate and calcium citrate malate using the spraying method. First, 6.56 g of hydroxypropyl methylcellulose is slowly added to 345.8 g of water and mixed under sheer and good agitation. Next, 4.8 g citric acid monohydrate is added to the gum solution. Next 79.3 g of calcium citrate malate is admixed with 1.24 g of ferrous bisglycinate and added to the mixture under sheer and good agitation. To this mixture, 4.96 g of spray-dried flavor and 42.44 g of absolute ethanol are added and mixed under good agitation.

Next 2 kg of rice is placed in a revolving pan. Hot air is forced into the pan as 264.1 g of the liquid mixture containing the calcium citrate malate and ferrous bisglycinate is sprayed onto the rice. When all of the liquid mixture is evenly applied the coated rice is allowed to dry to less than 14% moisture and/or less than 0.65 water activity. Next 600 g of the fortified rice is placed in the revolving pan and coated with all of a mixture of 85.09 g ethanol, 13.53 g of water and 1.38 g of zein (corn protein) slowly sprayed onto the rice and dried to less than 14% moisture and/or less than 0.65 water activity. From this process, 600 g of rice having a shiny surface appearance is produced and is fortified with ferrous bisglycinate and calcium citrate malate having an iron content of about 48 ppm and a calcium content of about 3200 ppm.

Example 5

The following is a method for fortifying white rice with ferrous bisglycinate and calcium citrate malate (the composition of the calcium citrate malate used in this example has a Citrate:Malate molar ratio of from about 50:50 with an Equivalents ratio of about 1) using the spraying method. First, 5.22 g of hydroxypropyl methylcellulose (HPMC) is slowly added to 269.38 g of water and mixed under sheer and good agitation. Next, a 20% gum acacia solution (10 g of gum acacia and 40 g of water) is added to the HPMC solution and mixed well. 2.56 g citric acid monohydrate is added to the gum solution. Next 63 g of calcium citrate malate is admixed with 0.905 g of ferrous bisglycinate and added to the liquid mixture under sheer and good agitation.

Next 1 kg of rice is placed in a revolving pan. Hot air is forced into the pan as 285 g of the liquid mixture containing the calcium citrate malate and ferrous bisglycinate is sprayed onto the rice. When all of the mixture is evenly applied the coated rice is allowed to dry to less than 14% moisture and/or less than 0.65 water activity. From this process, 1 kg of rice is fortified with ferrous bisglycinate and calcium citrate malate having an iron content of about 48 ppm and a calcium content of about 3200 ppm.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within thee scope of this invention.

INCORPORATION BY REFERENCE

All documents cited in the Detailed Description of the Invention are, in relevant part, incorporated herein by reference; the citation of any document is not to be construed as an admission that it is prior art with respect to the present invention.

What is claimed is:

1. Cereal grain kernels fortified with iron and calcium, wherein the calcium is in the form of calcium salts of citric acid and malic acid, and wherein the cereal grain kernels are rice.

2. The cereal grain kernels of claim 1, wherein the iron is in a form selected from the group consisting of ferric salts, ferrous salts, ferrous or ferric amino acid chelates, iron-sugar-carboxylate complexes, and mixtures thereof.

3. The cereal grain kernels of claim 2, wherein the iron is a ferrous salt selected from the group consisting of ferrous sulfate, ferrous fumarate, ferrous succinate, ferrous gluconate, ferrous lactate, ferrous tartrate, ferrous citrate, sodium iron ethylene diamine tetra acetate, and mixtures thereof.

4. The cereal grain kernels of claim 2, wherein the iron is in the form of a ferrous amino acid chelate.

5. The cereal grain kernels of claim 4, wherein the amino acid of the ferrous amino acid chelate is glycine.

6. The cereal grain kernels of claim 1 comprising at least about 0.001% of iron, by total weight of the cereal grain kernels.

7. The cereal grain kernels of claim 1 comprising from about from about 0.001% to about 0.1% of iron, by total weight of the cereal grain kernels.

8. The cereal grain kernels of claim 1 wherein the calcium is in a form selected from the group consisting of a mixture of calcium citrate and calcium malate, a complex of calcium containing citrate and malace ligands, a mixture of a calcium salt with citric acid and malic acid, and any combination thereof.

9. The cereal grain kernels of claim 1, wherein the Citrate:Malate Molar Ratio is from about 20:80 to about 70:30 and the Equivalents Ratio is from about 0.6 to about 1.4.

10. The cereal grain kernels of claim 1 comprising from about 0.03% to about 2% calcium, by total weight of the fortified cereal grain kernels.

11. The cereal grain kernels of claim 1 comprising from about 0.08% to about 1.5% calcium, by total weight of the fortified cereal grain kernels.

12. The cereal grain kernels of claim 1 comprising one or more optional ingredients selected from the group consisting of a coloring agent, an edible acid, an antioxidant, a flavoring agent, an aroma agent, and a mixture of any two or more of the foregoing.

13. The cereal grain kernels of claim 1, and further comprising a stabilizer wherein the kernels are coated with a food grade polymer.

14. The cereal grain kernels of claim 1, and further comprising a stabilizer selected from the group consisting of hydroxypropyl cellulose, hydroxypropyl methylcellulose, gum acacia, starches, modified starches, ethyl cellulose, shellac, and zein.

15. The cereal grain kernels of claim 1 wherein (i) the iron is selected from the group consisting of ferrous salt and ferrous amino acid chelates; and (ii) the calcium is in the form of calcium salts of citric acid and malic acid.

16. The cereal grain kernels of claim 15, wherein (i) the iron is in the form of a ferrous amino acid chelate; and (ii) the calcium is in a form selected from the group consisting of a mixture of calcium citrate and calcium malate, a complex of calcium containing citrate and malate ligands, a mixture of a calcium salt with citric acid and malic acid, and any combination thereof.

17. The cereal grain kernels of claim 16, wherein the kernels comprise (i) from about 0.001% to about 0.1% of iron, by total weight of the cereal grain kernels, and (ii) from about 0.08% to about 1.5% calcium, by total weight of the fortified cereal grain kernels.

18. Rice kernels fortified in the form of a coating with iron and calcium, wherein (i) the iron is a ferrous amino acid chelate; (ii) the calcium is in the form of calcium salts of citric acid and malic acid wherein the Citrate:Malate Molar Ratio is from about 20:80 to about 70:30 and the Equivalents Ratio is from about 0.6 to about 1.4; (iii) the rice comprises from about 0.002% to about 0.005% iron, by total weight of the rice; and (iv) the rice comprises from about 0.08% to about 1.5% calcium, by total weight of the rice.

19. A process for making fortified cereal grain kernels, the process comprising (a) providing cereal grain kernels and (b) mixing the cereal grain kernels with a liquid mixture comprising iron and calcium in the form of calcium salts of citric acid and malic acid to form a citrate-malate mixture, wherein the Citrate-Malate Molar Ratio is from about 10:90 to about 80:20 and the Equivalents Ratio is from about 0.5 to about 2.

* * * * *

UNITED STATES PATENT AND TRADEMARK OFFICE
CERTIFICATE OF CORRECTION

PATENT NO. : 7,371,422 B2  
APPLICATION NO. : 10/841610  
DATED : May 13, 2008  
INVENTOR(S) : Earl Cleve Christiansen et al.

Page 1 of 1

It is certified that error appears in the above-identified patent and that said Letters Patent is hereby corrected as shown below:

Column 5
Line 41, delete "omithine" and insert --ornithine--.

Column 12
Line 41, claim 1 after malic acid, insert --to form a mixture of calcium citrate and calcium malate, wherein the Citrate: Malate Molar Ratio is from about 10:90 to about 80:20 and the Equivalents Ratio is from about 0.5 to about 2,--.
Line 65, delete "malace" and insert --malate--.

Column 13
Line 21, claim 14 delete "methylceltulose" and insert --methylcellulose--.

Signed and Sealed this

Thirtieth Day of December, 2008

JON W. DUDAS  
*Director of the United States Patent and Trademark Office*